United States Patent
Kobayashi et al.

(10) Patent No.: US 8,063,351 B2
(45) Date of Patent: Nov. 22, 2011

(54) PHOTOELECTRIC CONVERSION APPARATUS AND IMAGE PICKUP SYSTEM USING PHOTOELECTRIC CONVERSION APPARATUS

(75) Inventors: Masahiro Kobayashi, Tokyo (JP); Tetsuya Itano, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 355 days.

(21) Appl. No.: 12/259,355

(22) Filed: Oct. 28, 2008

(65) Prior Publication Data
US 2009/0050787 A1 Feb. 26, 2009

Related U.S. Application Data

(63) Continuation of application No. 11/774,262, filed on Jul. 6, 2007, now Pat. No. 7,462,810.

(30) Foreign Application Priority Data

Aug. 1, 2006 (JP) ................................ 2006-209755

(51) Int. Cl.
    *H01L 27/00* (2006.01)
(52) U.S. Cl. .................................... 250/208.1; 348/372
(58) Field of Classification Search ............... 250/208.1; 348/372
    See application file for complete search history.

(56) References Cited

U.S. PATENT DOCUMENTS

| 6,797,933 | B1 | 9/2004 | Mendis et al. ............. 250/208.1 |
| 7,116,365 | B1 | 10/2006 | Ueno et al. ..................... 348/308 |
| 7,126,102 | B2 | 10/2006 | Inoue et al. ............... 250/214 R |
| 7,268,331 | B2 | 9/2007 | Koyama ..................... 250/208.1 |
| 2001/0028401 | A1* | 10/2001 | Miyashita et al. ............ 348/311 |
| 2004/0099792 | A1* | 5/2004 | Ducourant et al. ........ 250/214 R |
| 2005/0269484 | A1 | 12/2005 | Gomi ......................... 250/208.1 |
| 2005/0269607 | A1 | 12/2005 | Henderson .................... 257/292 |
| 2006/0186313 | A1 | 8/2006 | Yokota et al. .............. 250/208.1 |
| 2006/0208161 | A1 | 9/2006 | Okita et al. ................ 250/208.1 |
| 2006/0208291 | A1 | 9/2006 | Koizumi et al. .............. 257/292 |
| 2006/0208292 | A1 | 9/2006 | Itano et al. .................... 257/292 |
| 2006/0221667 | A1 | 10/2006 | Ogura et al. .................. 365/149 |
| 2007/0096238 | A1 | 5/2007 | Oike et al. .................... 257/443 |
| 2007/0165125 | A1 | 7/2007 | Kochi .......................... 348/300 |
| 2007/0258008 | A1* | 11/2007 | Kameshima et al. ......... 348/372 |
| 2008/0029787 | A1 | 2/2008 | Watanabe et al. ............. 257/233 |
| 2008/0029793 | A1 | 2/2008 | Watanabe et al. ............. 257/291 |
| 2008/0030612 | A1 | 2/2008 | Itano et al. .................... 348/340 |
| 2008/0158403 | A1 | 7/2008 | Itano et al. .................... 348/308 |

FOREIGN PATENT DOCUMENTS

| JP | 11-103418 A | 4/1999 |
| JP | 11-355668 A | 12/1999 |

(Continued)

*Primary Examiner* — Georgia Epps
*Assistant Examiner* — Kevin Wyatt
(74) *Attorney, Agent, or Firm* — Fitzpatrick, Cella, Harper & Scinto

(57) ABSTRACT

A photoelectric conversion apparatus includes a photoelectric conversion area in which a plurality of photoelectric conversion elements are arranged to convert incident light into electric charges, a plurality of amplifying units are arranged to read and supply signals based on the electric charges of corresponding photoelectric conversion elements to output lines, a plurality of transfer units are arranged to transfer the electric charges of the corresponding photoelectric conversion elements to input units for corresponding amplifying units, and a plurality of voltage supply units are arranged to supply to corresponding input units voltages for setting the corresponding input units to have first and second potentials are disposed two-dimensionally, and a plurality of voltage supply control units are arranged to supply a voltage to corresponding voltage supply units of the plurality of voltage supply units.

7 Claims, 17 Drawing Sheets

FOREIGN PATENT DOCUMENTS

| | | |
|---|---|---|
| JP | 2004-274229 | 9/2004 |
| JP | 2005-5911 A | 1/2005 |
| JP | 2005-260790 A | 9/2005 |
| JP | 2005-354145 A | 12/2005 |

* cited by examiner

PHOTOELECTRIC CONVERSION APPARATUS AND IMAGE PICKUP SYSTEM USING PHOTOELECTRIC CONVERSION APPARATUS

CROSS REFERENCE TO RELATED APPLICATION

The present application is a continuation of U.S. application Ser. No. 11/774,262, filed on Jul. 6, 2007, the entire disclosure of which is hereby incorporated by reference herein.

BACKGROUND OF THE INVENTION

1. Field of the Invention

The present invention relates to a photoelectric conversion apparatus and an image pickup system using the photoelectric conversion apparatus.

2. Description of the Related Art

As photoelectric conversion apparatuses used for digital cameras, video cameras, or the like, charge-coupled device (CCD) photoelectric conversion apparatuses or metal-oxide semiconductor (MOS) photoelectric conversion apparatuses have been available. In particular, in recent years, the technological development of complementary metal-oxide semiconductor (CMOS) photoelectric conversion apparatuses has been actively conducted due to advantages of a reduced power consumption and an excellent compatibility with semiconductor processes. Furthermore, in order to satisfy a requirement for increasing the number of pixels and to improve the sensitivity per unit pixel, various configurations in which the number of MOS transistors per unit pixel is reduced have been suggested.

Under such circumstances, in order to increase the light-receiving area of a photoelectric conversion element, a configuration in which the number of MOS transistors is reduced has been examined. For example, a photoelectric conversion apparatus that selects pixels in units of rows by controlling the drain potentials of reset MOS transistors is disclosed, for example, in Japanese Patent Laid-Open No. 11-355668. In addition, a photoelectric conversion apparatus that selects pixels in units of rows by controlling, by a pixel power supply driving circuit, the drain voltages of reset transistors and amplifying transistors that are commonly connected is disclosed, for example, in Japanese Patent Laid-Open No. 2005-005911.

In a case where a further increase in the number of pixels, finer wiring, and the like are required, when the configuration described in Japanese Patent Laid-Open No. 11-355668 or 2005-005911 is used, the load on a power supply line for supplying a voltage to a pixel power supply voltage circuit or to a reset MOS transistor is increased in accordance with an increase in the size of a photoelectric conversion area.

Thus, the time necessary for charging and discharging the power supply line is increased. As a result, a problem may occur in that the time necessary for reading a signal is increased and the frame rate is thus reduced. In addition, due to a voltage drop, a power supply voltage supplied to the drain of a reset MOS transistor is varied in a photoelectric conversion area. In accordance with an increase in the size of the photoelectric conversion area, the variation increases. Thus, a phenomenon called shading may often occur in which a difference in signal output levels is generated within the photoelectric conversion area.

SUMMARY OF THE INVENTION

The present invention improves the frame rate or suppresses the occurrence of shading.

According to an aspect of the present invention, a photoelectric conversion apparatus includes a photoelectric conversion area including a photoelectric conversion element arranged to convert incident light into electric carriers; an amplifying unit arranged to read and supply signals based on the electric carriers of corresponding photoelectric conversion element to an output line; a transfer unit arranged to transfer the electric carriers of the corresponding photoelectric conversion element to an input unit of amplifying unit; a voltage supply unit arranged to supply to corresponding input unit voltages for setting the corresponding input unit to have at least first and second potentials; a plurality of power supply lines arranged to supply voltages to the plurality of voltage supply units; and a plurality of voltage supply control circuits each disposed in a power supply channel between the plurality of power supply lines and corresponding voltage supply units of the plurality of voltage supply units and arranged to control voltage supply to the corresponding voltage supply units, wherein the photoelectric conversion element, the amplifying unit, the transfer unit, and the voltage supply unit are disposed two-dimensionally.

Other features and advantages of the present invention will be apparent from the following description taken in conjunction with the accompanying drawings, in which like reference characters designate the same or similar parts throughout the figures thereof.

The accompanying drawings, which are incorporated in and constitute a part of the specification, illustrate embodiments of the invention and, together with the description, serve to explain the principles of the invention.

DESCRIPTION OF THE EMBODIMENTS

First Embodiment

Figure 1:
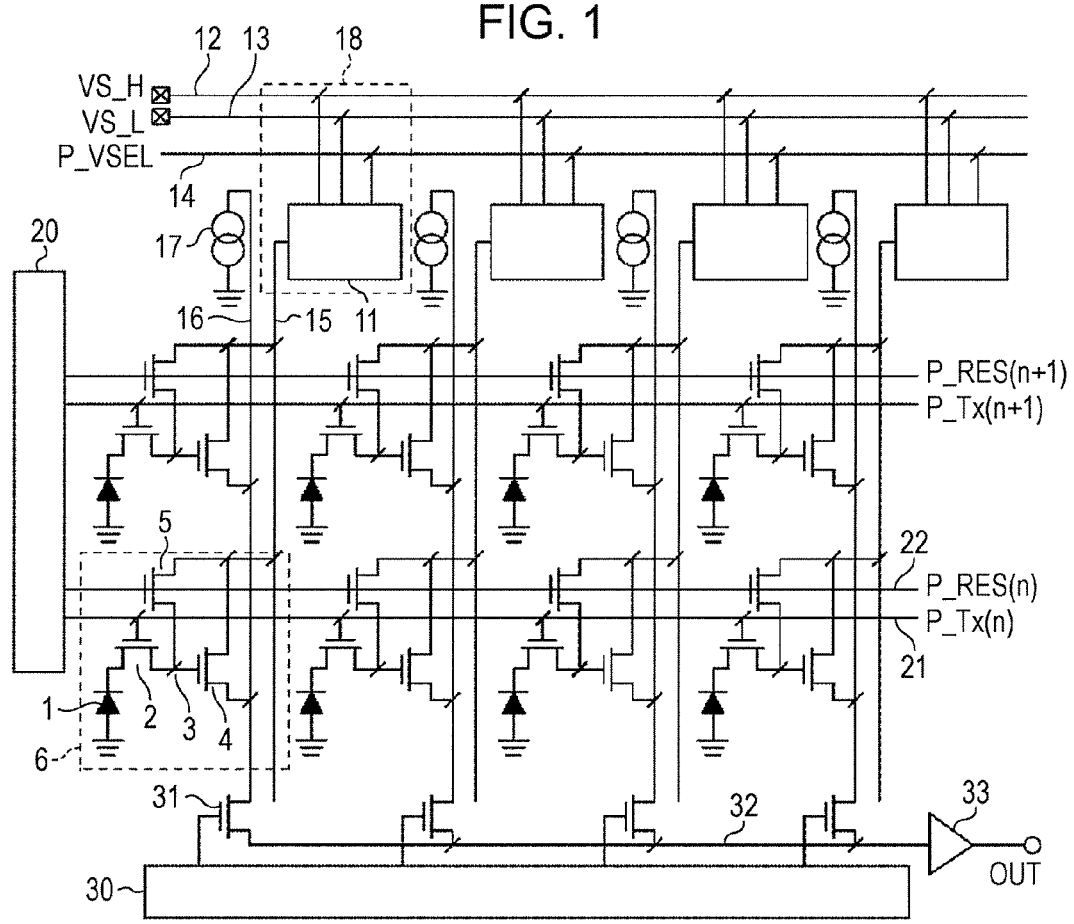
FIG. 1 is a schematic diagram for explaining a photoelectric conversion apparatus according to a first embodiment.

FIG. 1 is a schematic diagram showing a first embodiment of the present invention. Referring to FIG. 1, eight pixels 6 are arranged two-dimensionally. An area in which the pixels 6 are disposed is referred to as a photoelectric conversion area.

A photoelectric conversion element 1 converts incident light into an electric charge. A transfer unit 2 transfers the electric charge of the photoelectric conversion element 1 to an input unit 3 for an amplifying unit. The transfer unit 2 may be a MOS transistor. A floating diffusion (FD) region formed on a semiconductor substrate may be used as the input unit 3. A MOS transistor (amplifying MOS transistor) 4 forms the amplifying unit. The gate of the amplifying unit (amplifying MOS transistor) 4 is electrically connected to the input unit (FD region) 3. The amplifying unit (amplifying MOS transistor) 4 is configured as a well-known source follower circuit.

A voltage supply unit 5 supplies a voltage to the input unit (FD region) 3. The voltage supply unit 5 may be a MOS transistor. In particular, a reset MOS transistor that sets the potential of the input unit (FD region) 3 to a predetermined value may be used as the voltage supply unit 5. The input unit (FD region) 3 serves as the drain of the transfer unit (transfer MOS transistor) 2. The input unit (FD region) 3, the gate of the amplifying unit (amplifying MOS transistor) 4, and the source of the voltage supply unit (reset MOS transistor) 5 are connected to the drain of the transfer unit (transfer MOS transistor) 2. The drain of the voltage supply unit (reset MOS transistor) 5 is connected to a voltage supply line 15. The source of the amplifying unit (amplifying MOS transistor) 4 is connected to an output line 16.

Pixels can be disposed in a matrix in the photoelectric conversion area. Alternatively, photoelectric conversion elements 1, transfer units (transfer MOS transistors) 2, amplifying units (amplifying MOS transistors) 4, and voltage supply units (reset MOS transistors) 5 can be disposed in a matrix in the photoelectric conversion area.

A signal reading sequence will be described. An electric charge in the photoelectric conversion element 1 is transferred via the transfer unit (transfer MOS transistor) 2 to the input unit (FD region) 3 for the amplifying unit (amplifying MOS transistor) 4. A signal based on a change of the potential of the input unit (FD region) 3 is read by the amplifying unit (amplifying MOS transistor) 4 and supplied to the output line 16. The signal is output to the outside.

Here, a pixel represents a photoelectric conversion element and the smallest unit of an element set for reading a signal from the photoelectric conversion element to an output line. The element set includes the transfer unit (transfer MOS transistor) 2, the amplifying unit (amplifying MOS transistor) 4, and the voltage supply unit (reset MOS transistor) 5. The above-mentioned element set may be shared with photoelectric conversion elements that are adjacent to each other. In this case, however, a pixel is defined by the smallest unit of an element set for reading a signal of a photoelectric conversion element.

A voltage supply control circuit 11 is connected to the voltage supply line 15 in a corresponding column. The voltage supply control circuit 11, together with a power supply line 12 to which a high-level voltage (5 V) is applied, a power supply line 13 to which a low-level voltage (0 V) is applied, and a pixel power supply selecting signal line 14, forms a power-supply controller 18. The voltage supply control circuit 11 is provided in a power supply channel between the power supply lines 12 and 13 and a plurality of voltage supply units (reset MOS transistors) 5. Thus, the voltage supply control circuit 11 controls voltage supply to the plurality of voltage supply units (reset MOS transistors) 5. The power supply lines 12 and 13 and the pixel power supply selecting signal line 14 can be shared with a plurality of power-supply controllers 18.

Figure 2:
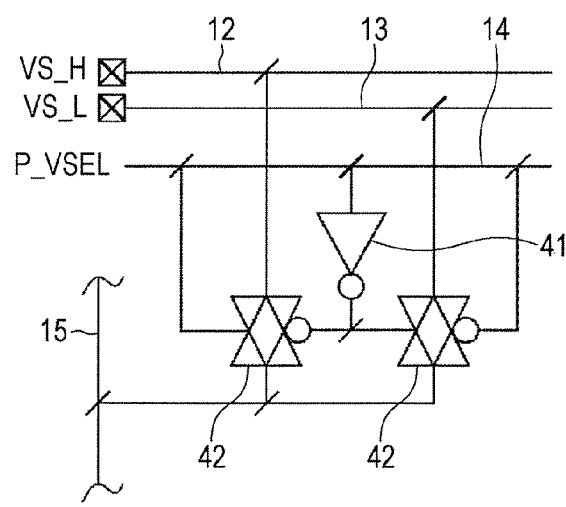
FIG. 2 is a schematic diagram showing an example of a voltage supply control circuit according to an embodiment of the present invention.

FIG. 2 shows an example of the configuration of the power-supply controller 18. The power-supply controller 18 is arranged to output to the voltage supply line 15 a power supply level of the power supply line 12 or the power supply line 13 using an inverter 41 and a CMOS switch 42 in accordance with the level of a pulse P_VSEL transmitted through the pixel power supply selecting signal line 14. Referring to FIG. 2, when the level of the pulse P_VSEL is high, a high-level voltage (5 V) is applied to the voltage supply line 15. When the level of the pulse P_VSEL is low, a low-level voltage (0 V) is applied to the voltage supply line 15. It is desirable that voltages are always supplied to the power supply line 12 and the power supply line 13. When no voltage is supplied to the voltage supply line 15 for a certain period of time, voltage supply can be stopped during the certain period of time. The configuration described above can be applied to the embodiments described below.

A feature of the first embodiment is that the voltage supply control circuits 11 configured as described above are provided for individual columns.

An operation of the photoelectric conversion apparatus shown in FIG. 1 will be described with reference to a schematic timing diagram shown in FIG. 3. An operation in the nth row will be briefly described, where a row from which optical signals of pixels are output, that is, a selected row, is denoted by the nth row and another row, that is, a non-selected row, is denoted by the n+1th row.

Figure 3:
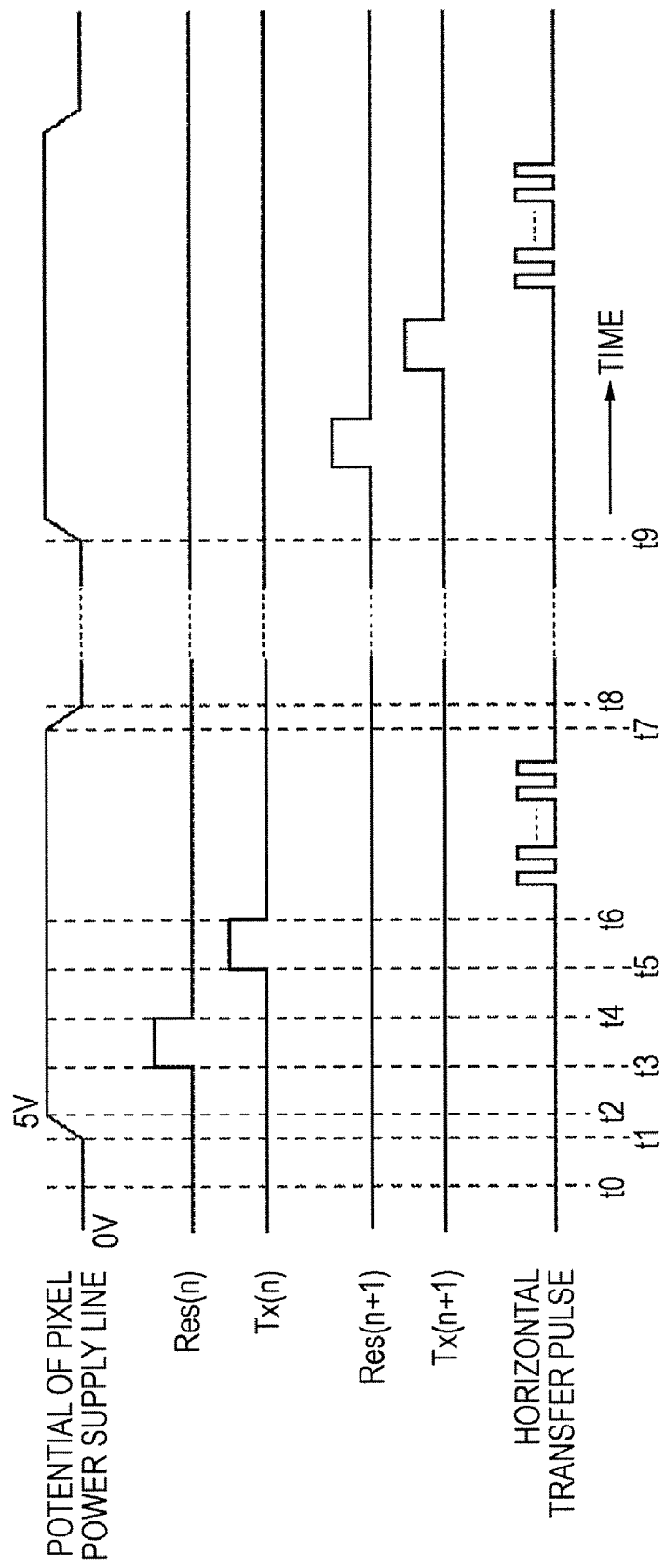
FIG. 3 is a schematic diagram showing timing for explaining an operation of the photoelectric conversion apparatus according to the first embodiment.

Referring to FIG. 3, at time t0, the potentials of the voltage supply lines 15 set by the voltage supply control circuits 11 are low (0 V). The levels of reset switch control pulses P_Res(n) and P_Res(n+1) and transfer switch control pulses P_Tx(n) and P_Tx(n+1) are low. At this time, the voltage supply units (reset MOS transistors) 5 are in a non-conductive state, and the input units (FD regions) 3 have a low potential (about 0 V) and are in a floating state. In addition, the amplifying units (amplifying MOS transistors) 4 are in a non-selected state. Thus, the potentials of the output lines 16 are not changed.

During the period from time t1 to time t2, the voltage supply lines 15 reach a high potential (5 V) by the voltage supply control circuits 11 provided for the individual columns. Here, the pulse P_VSEL is at a high level. Since the voltage supply control circuits 11 are provided for the individual columns in which the voltage supply lines 15 are disposed, the time necessary for charging the voltage supply lines 15 can be reduced compared with known techniques. This is because a line to be set to a high potential by one of the voltage supply control circuits 11 is only a voltage supply line 15 provided for a corresponding column. Thus, the time necessary for charging all the voltage supply lines 15 within the photoelectric conversion area from the low potential (0 V) to the high potential (5 V) can be reduced.

During the period from time t3 to time t4, the level of the reset switch control pulse P_Res(n) in the nth row is set to high. Here, the voltage supply units (reset MOS transistors) 5 are in a conductive state, the potentials of the input units (FD regions) 3 are set to high, and the amplifying units (amplifying MOS transistors) 4 are in a selected state. Thus, a state in which the potentials of the output lines 16 are changed in accordance with potential changes of the input units (FD regions) 3 included in the pixels in the nth row, that is, a state in which the pixels in the nth row are selected, is reached.

Then, during the period from time t5 to time t6, the level of the transfer switch control pulse P_Tx(n) in the nth row is set to high. Here, the transfer units (transfer MOS transistors) 2 are in the conductive state, and electric charges are transferred from the photoelectric conversion elements 1 to the input units (FD regions) 3. The potentials of the input units (FD regions) 3 are changed in accordance with the amounts of transferred electric charges, and the potentials of the output lines 16 are changed through the amplifying units (amplifying MOS transistors) 4.

Then, during the period from time t6 to time t7, during which the level of the transfer switch control pulse P_Tx(n) in the nth row is set to low, horizontal transfer pulses sequentially reach the conductive state, and horizontal transfer switches 31 sequentially reach the conductive state. Then, the signal levels of the output lines 16 are sequentially output through a horizontal signal transfer line 32 and an output amplifier 33. That is, signals read in parallel from the plurality of output lines 16 are sequentially read.

Then, during the period from time t7 to time t8, the voltage supply lines 15 reach a low potential (0 V) by the voltage supply control circuits 11 provided for the individual columns. Here, since the voltage supply control circuits 11 are provided for the voltage supply lines 15 disposed in individual columns, the time necessary for setting the voltage supply lines 15 to have a desired potential can be reduced compared with known techniques. The time necessary for setting all the voltage supply lines 15 within the photoelectric conversion area to have a desired potential can be reduced. Then, an operation for selecting pixels in the n+1th row is performed.

With the configuration used in the first embodiment, since the voltage supply control circuits 11 are provided for the individual columns, the time necessary for setting the voltage supply lines 15 to have a desired potential can be reduced even when the size of the photoelectric conversion area is increased. Thus, the frame rate can be improved.

Second Embodiment

Figure 4:
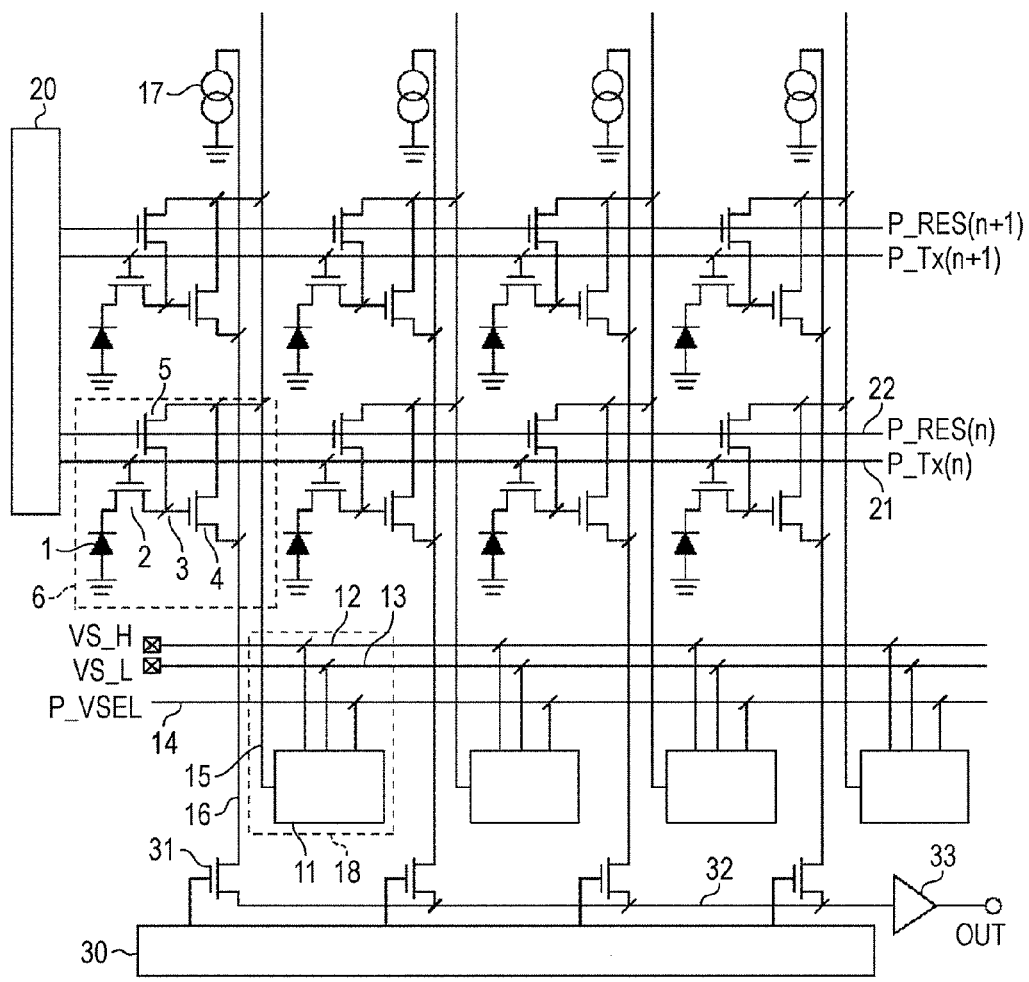
FIG. 4 is a schematic diagram for explaining a photoelectric conversion apparatus according to a second embodiment.

FIG. 4 is a schematic diagram showing a second embodiment of the present invention. The second embodiment is different from the first embodiment in the positions of the voltage supply control circuits 11. A feature of the second embodiment is that the voltage supply control circuits 11 are disposed symmetrically to constant-current sources 17, serving as load units connected to the output lines 16, with respect to the photoelectric conversion area. The operation of the photoelectric conversion apparatus according to the second embodiment is similar to that of the first embodiment. Thus, the explanation of the operation of the photoelectric conversion apparatus according to the second embodiment will be omitted.

With the configuration used in the second embodiment, since the voltage supply control circuits 11 are provided for the individual columns, the frame rate can be improved. In addition, since the influence of power supply deviation caused by coupling of power supply wiring, which is generated by the voltage supply control circuits 11 disposed near the constant-current sources 17, can be suppressed, a stable voltage can be applied to each of the voltage supply lines 15. In addition, since the voltage supply control circuits 11 can be disposed near the photoelectric conversion area, the parasitic resistance generated in wiring can be reduced. Thus, a voltage drop can be suppressed.

Third Embodiment

Figure 5:
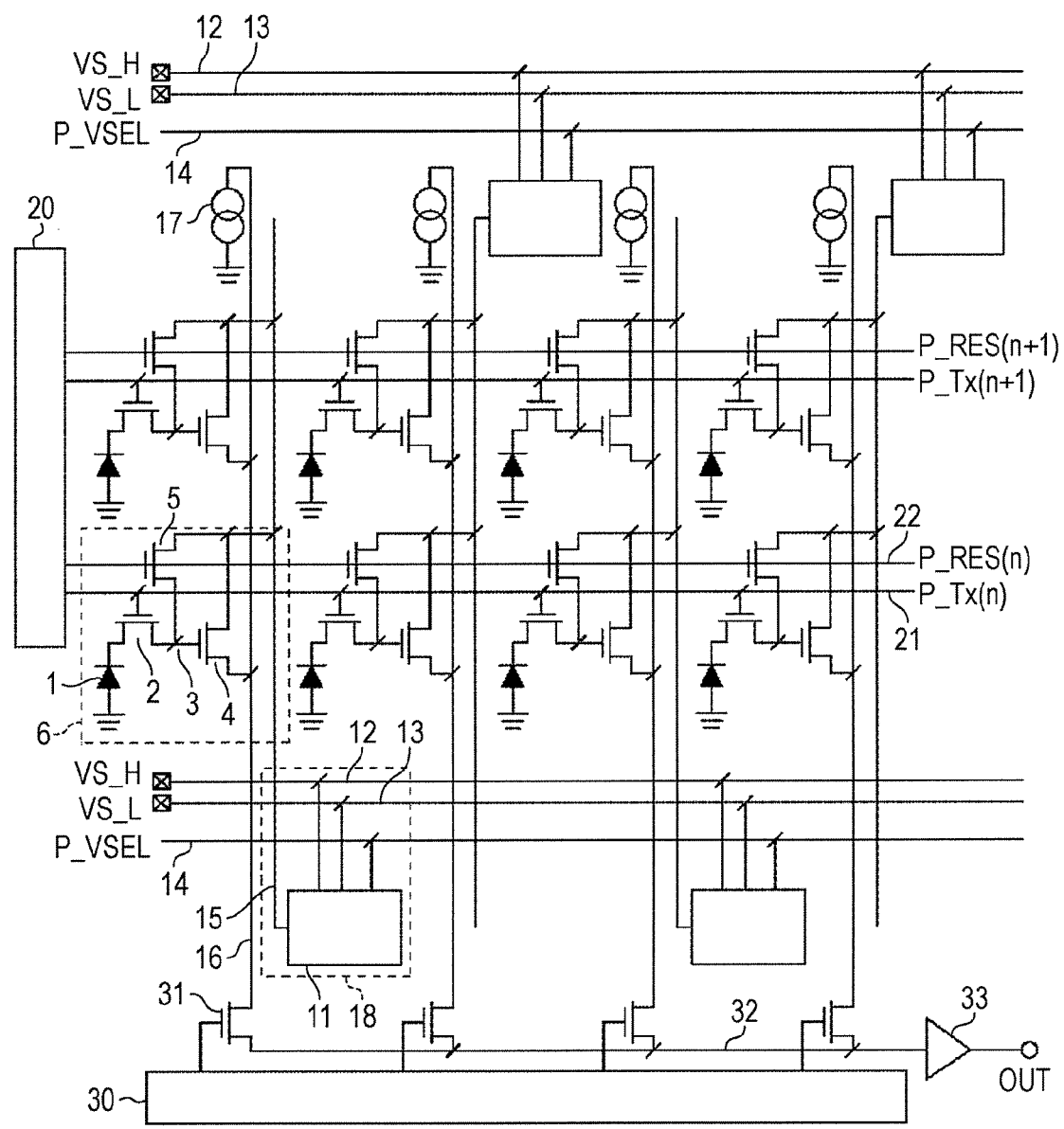
FIG. 5 is a schematic diagram for explaining a photoelectric conversion apparatus according to a third embodiment.

FIG. 5 is a schematic diagram showing a third embodiment of the present invention. The third embodiment is different from the first embodiment in that the voltage supply control circuits 11 are alternately disposed on one side and the other side of the photoelectric conversion area such that a voltage supply control circuit 11 disposed in a column diagonally faces a voltage supply control circuit 11 disposed in an adjacent column across the photoelectric conversion area. Although not illustrated, the voltage supply control circuits 11 may be disposed such that a circuit group including a plurality of voltage supply control circuits 11 diagonally faces an adjacent circuit group including a plurality of voltage supply control circuits 11 across the photoelectric conversion area. The operation of the photoelectric conversion apparatus according to the third embodiment is similar to that of the first embodiment. Thus, the explanation of the operation of the photoelectric conversion apparatus according to the third embodiment will be omitted.

Figure 6A:
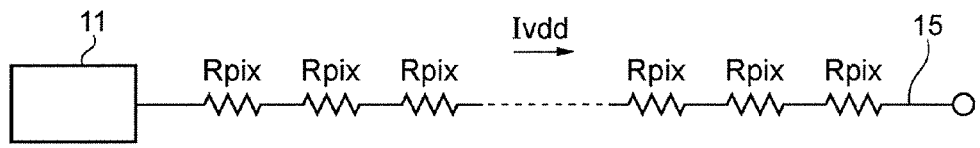
FIGS. 6A and 6B are schematic diagrams for explaining a voltage drop in a voltage supply line.
Figure 6B:
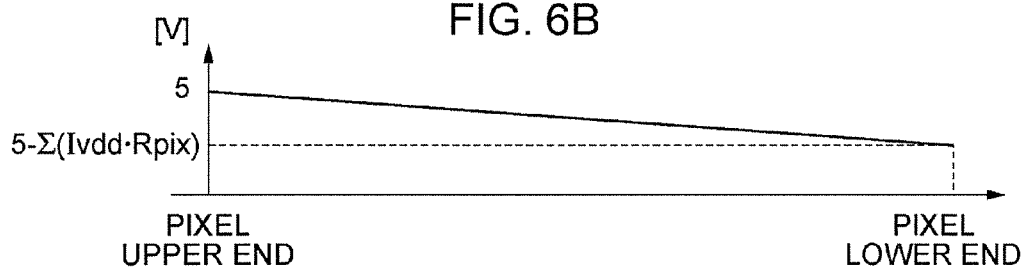

A voltage drop generated, as shown in FIG. 6A, in the voltage supply line 15 set by the voltage supply control circuit 11 will be considered. The sum of the wiring resistance of the voltage supply line 15 and the ON-OFF resistance of a transistor driven by the voltage supply line 15 per unit pixel 6 is denoted by Rpix and a current flowing to the voltage supply line 15 is denoted by Ivdd. As shown in FIG. 6B, a potential difference corresponding to the sum $\Sigma(Ivdd \cdot Rpix)$ of voltage drops of all the pixels is generated between an upper end and a lower end of the photoelectric conversion area. This indicates that when light at the same level is incident to a pixel at the upper end and to a pixel at the lower end, the difference $\Sigma(Ivdd \cdot Rpix)$ is generated in output signals. That is, this difference may cause a phenomenon called shading.

Figure 7A:
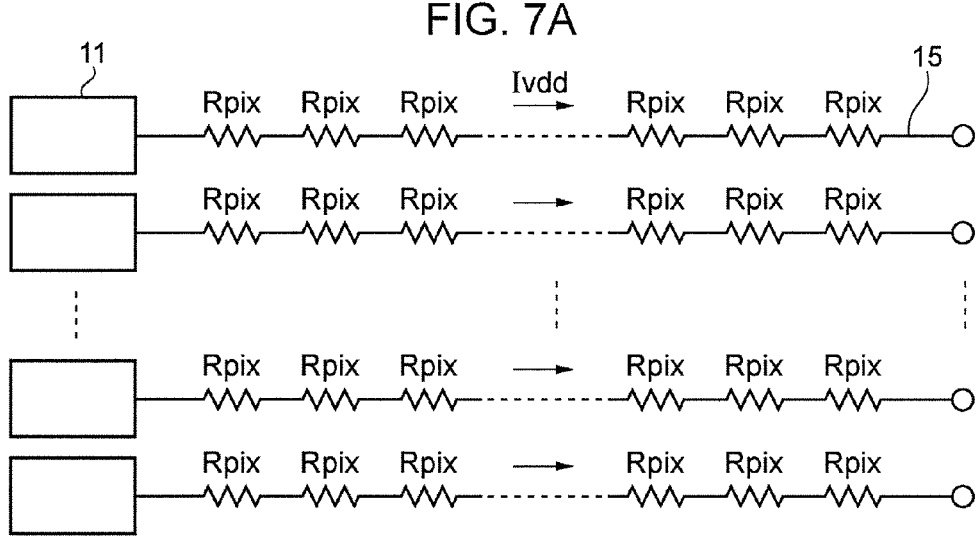
FIGS. 7A and 7B are schematic diagrams for explaining voltage drops when voltage supply lines are charged from one side.
Figure 7B:
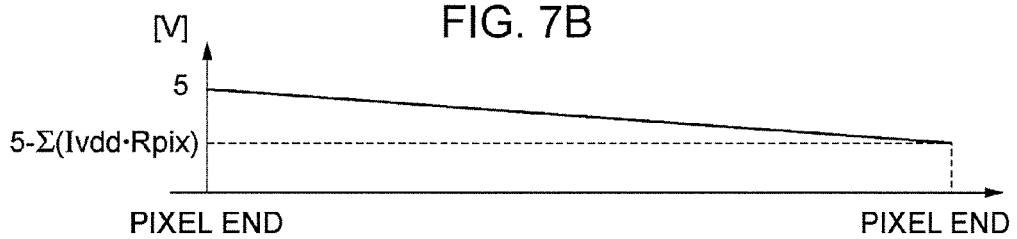
Figure 8A:
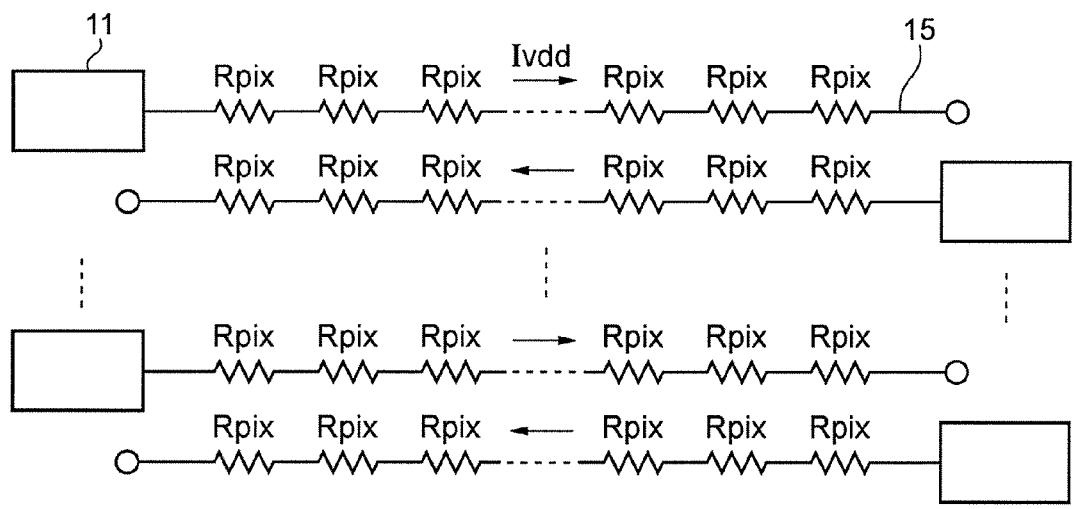
FIGS. 8A and 8B are schematic diagrams for explaining voltage drops when voltage supply lines are alternately charged from one side and the other side such that a voltage supply line disposed in a column is charged from one side and a voltage supply line disposed in an adjacent column is charged from the other side.
Figure 8B:
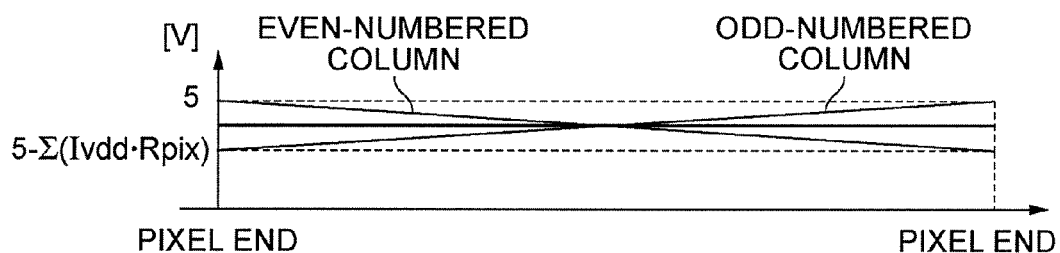

A case where the voltage supply control circuits 11 are disposed only at the upper end, as shown in FIG. 7A, and set the potentials of the voltage supply lines 15 will be considered. Here, as shown in FIG. 7B, a difference $\Sigma(Ivdd \cdot Rpix)$ is generated in signals output at the upper end and the lower end in each column. Thus, in terms of the entire outputs, a conspicuous output difference between the upper end and the lower end is observed. Next, a case where the voltage supply control circuits 11 are alternately disposed at the upper end and the lower end, as shown in FIG. 8A, and set the potentials of the voltage supply lines 15 will be considered. In this case, although there is a potential difference $\Sigma(Ivdd \cdot Rpix)$ in each column, the direction of the potential difference in an evennumbered column is opposite to the direction of the potential difference in an odd-numbered column. Thus, as shown in FIG. 8B, in terms of the entire outputs, an average of shadings in individual columns can be visually recognized. Thus, the image quality can be significantly improved. In addition, since a voltage supply control circuit 11 can be provided for each two columns, the voltage supply control circuits 11 can be easily disposed even when the pixel size is reduced.

As described above, with the configuration used in the third embodiment, in addition to the improvement in the frame rate due to the voltage supply control circuits 11 provided for the individual columns, the suppression of the shading phenomenon caused by a difference in voltage drop in the column direction of each of the voltage supply lines 15 can be significantly achieved. Furthermore, elements and circuits can be easily disposed even when the pixel size is reduced.

Fourth Embodiment

Figure 9:
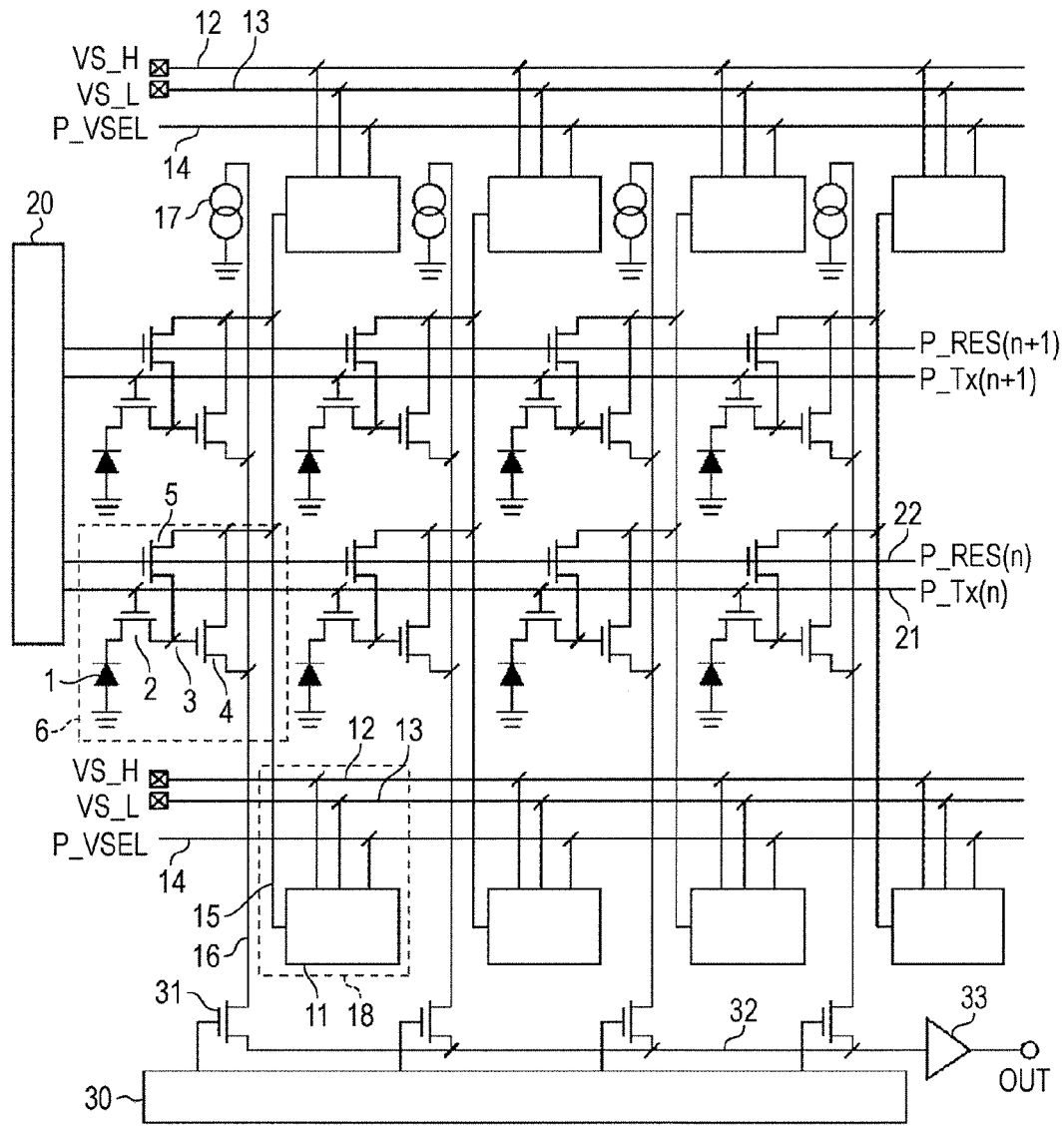
FIG. 9 is a schematic diagram for explaining a photoelectric conversion apparatus according to a fourth embodiment.

FIG. 9 is a schematic diagram showing a fourth embodiment of the present invention. The fourth embodiment is different from the first embodiment in that the voltage supply control circuits 11 are disposed such that voltage supply control circuits are provided for an individual column on both sides of the photoelectric conversion area. The operation of the photoelectric conversion apparatus according to the fourth embodiment is similar to that of the first embodiment. Thus, the explanation of the operation of the photoelectric conversion apparatus according to the fourth embodiment will be omitted.

Figure 10A:
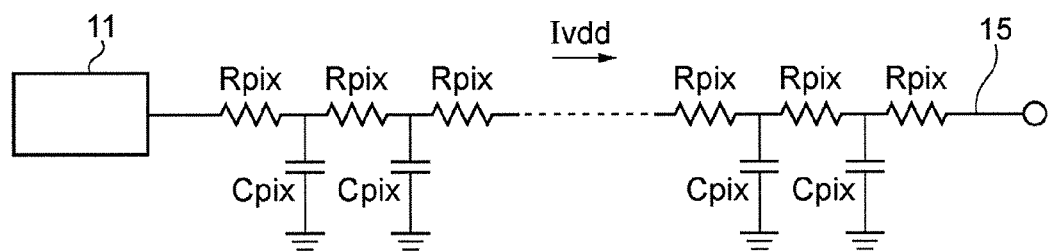
FIGS. 10A and 10B are schematic diagrams for explaining a time constant when charging and discharging of voltage supply lines are performed from one side.
Figure 10B:
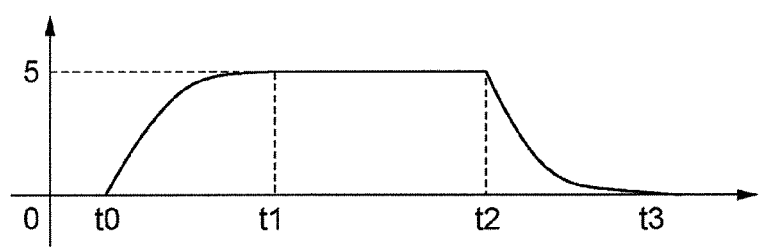

A temporal change of a voltage of the voltage supply line 15 set by the voltage supply control circuit 11 in a case shown in FIG. 10A will be considered. The sum of the wiring resistance of the voltage supply line 15 and the ON-OFF resistance of a transistor driven by the voltage supply line 15 per unit pixel 6 is denoted by Rpix. The sum of the wiring capacitance of the voltage supply line 15 and the gate capacitance of a transistor driven by the voltage supply line 15 per unit pixel 6 is denoted by Cpix. In this case, as shown in FIG. 10B, the potential of the voltage supply line 15 temporally changes. Referring to FIG. 10B, charging to the voltage supply line 15 starts at time t0, charging ends at time t1, discharging starts at time t2, and discharging ends at time t3. Here, each of the period of time from time t0 to time t1 and the period of time from time t2 to time t3 is proportional to the product of the sum Rpix and the sum Cpix, which is an RC time constant of the voltage supply line 15.

Figure 11A:
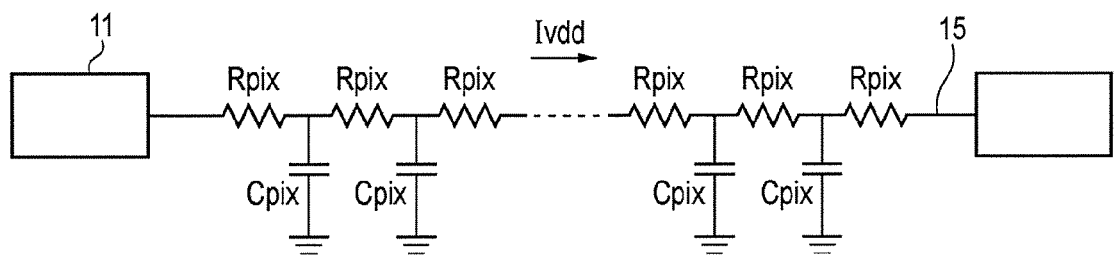
FIGS. 11A, 11B, and 11C are schematic diagrams for explaining a time constant when charging and discharging of voltage supply lines are performed from both sides.
Figure 11B:
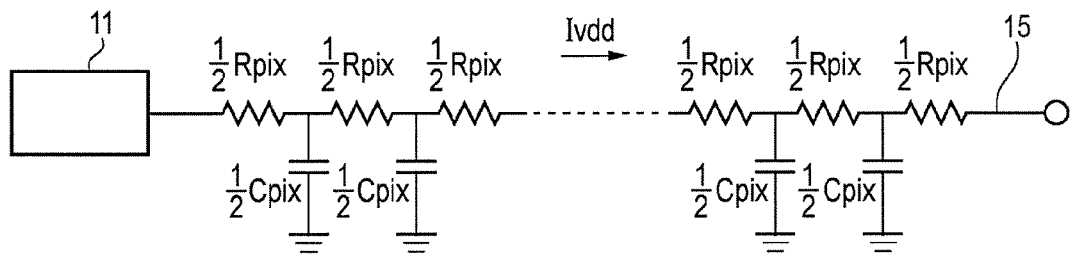
Figure 11C:
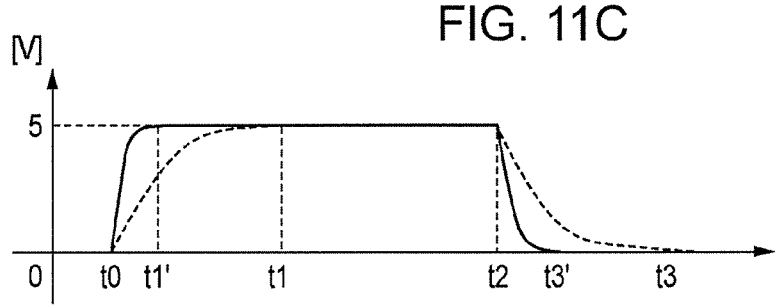

Next, a case where voltages are supplied from both ends of the voltage supply line 15, as shown in FIG. 11A, will be considered. In this case, as shown in FIG. 11B, the sums Rpix and Cpix are equivalent to half the sums Rpix and Cpix shown in FIG. 10A. Here, referring to FIG. 11C, charging to the voltage supply line 15 starts at time t0, charging ends at time t1', discharging starts at time t2, and discharging ends at time t3'. Concerning each of the period of time from time t0 to t1' and the period of time from time t2 to time t3', since the RC time constant of the voltage supply line 15 is proportional to the product of a value Rpix/2 and a value Cpix/2, the potential of the voltage supply line 15 can be set in a time one-fourth the time necessary for the case shown in FIG. 10B.

In addition, although a large voltage drop is generated in the middle of the voltage supply line 15 since the potential of the voltage supply line 15 is set from both sides, an absolute value of the shading amount is reduced, as shown in FIG. 11B, to half the value in a case where the voltage supply line 15 is driven from one side.

As described above, with the configuration used in the fourth embodiment, in addition to the improvement in the frame rate due to the voltage supply control circuits 11 provided for the individual columns, a further improvement in the frame rate can be achieved since potential setting can be performed at a higher speed. Furthermore, the shading phenomenon caused by a difference in voltage drop in the column direction of each of the voltage supply lines 15 can be suppressed.

Fifth Embodiment

Figure 12:
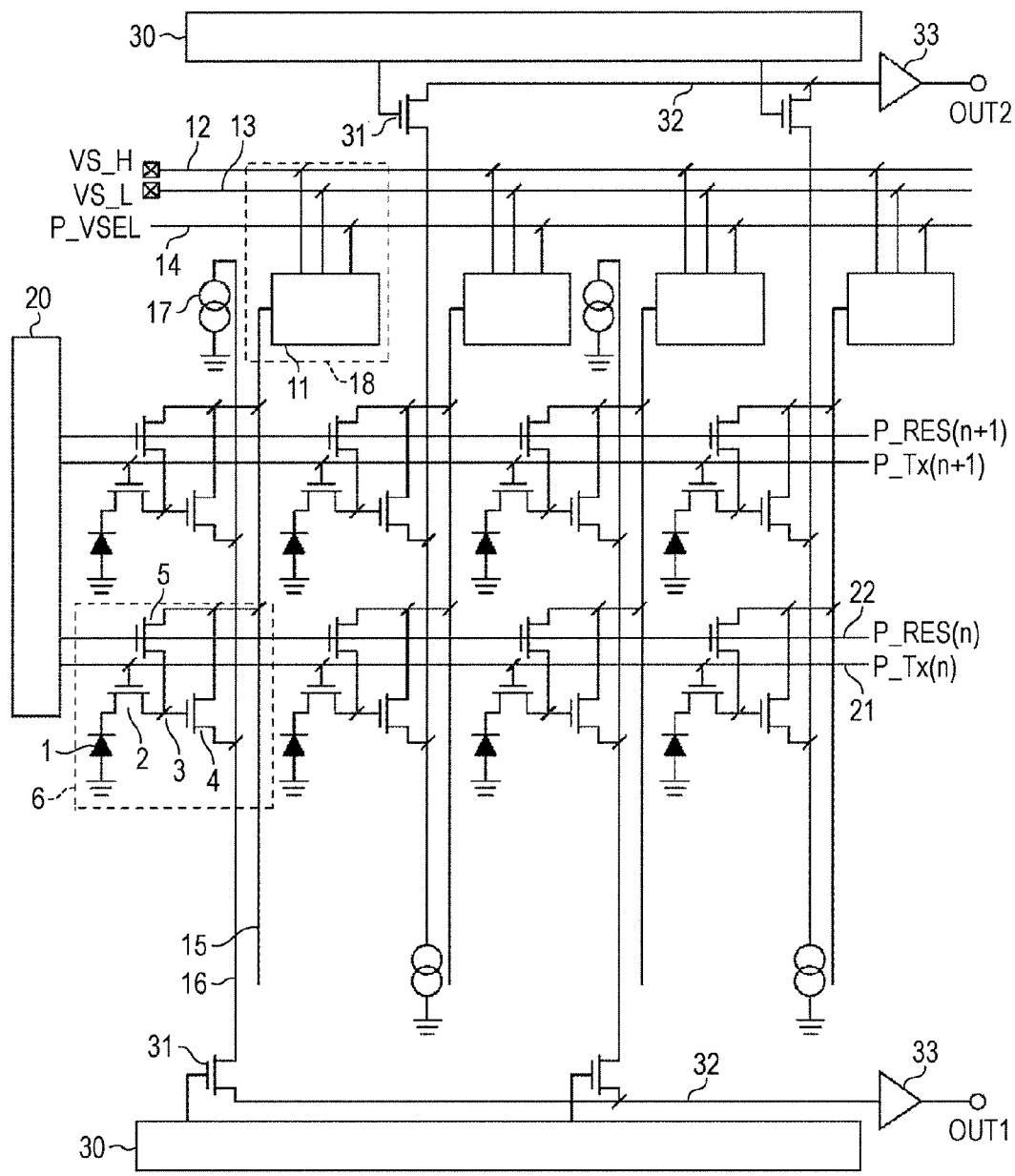
FIG. 12 is a schematic diagram for explaining a photoelectric conversion apparatus according to a fifth embodiment.

FIG. 12 is a schematic diagram showing a fifth embodiment of the present invention. The fifth embodiment is different from the first embodiment in reading of signals from the photoelectric conversion area. Outputs from the photoelectric conversion area are read to a plurality of upper and lower channels. The operation of the photoelectric conversion apparatus according to the fifth embodiment is similar to that of the first embodiment. Thus, the explanation of the operation of the photoelectric conversion apparatus according to the fifth embodiment will be omitted.

Since the voltage supply control circuits 11 are provided for the individual columns in which the voltage supply lines 15 are disposed, the time necessary for setting the potentials of the voltage supply lines 15 can be reduced. Thus, the time necessary for setting the potentials of all the voltage supply lines 15 in the photoelectric conversion area can be reduced.

In addition, since the voltage supply control circuits 11 are provided for the individual columns, the time necessary for setting the potentials of the voltage supply lines 15 can be reduced even when the size of the photoelectric conversion area is increased. The photoelectric conversion apparatus in which outputs are read to the plurality of upper and lower channels also achieves the improvement in the frame rate.

Sixth Embodiment

Figure 13:
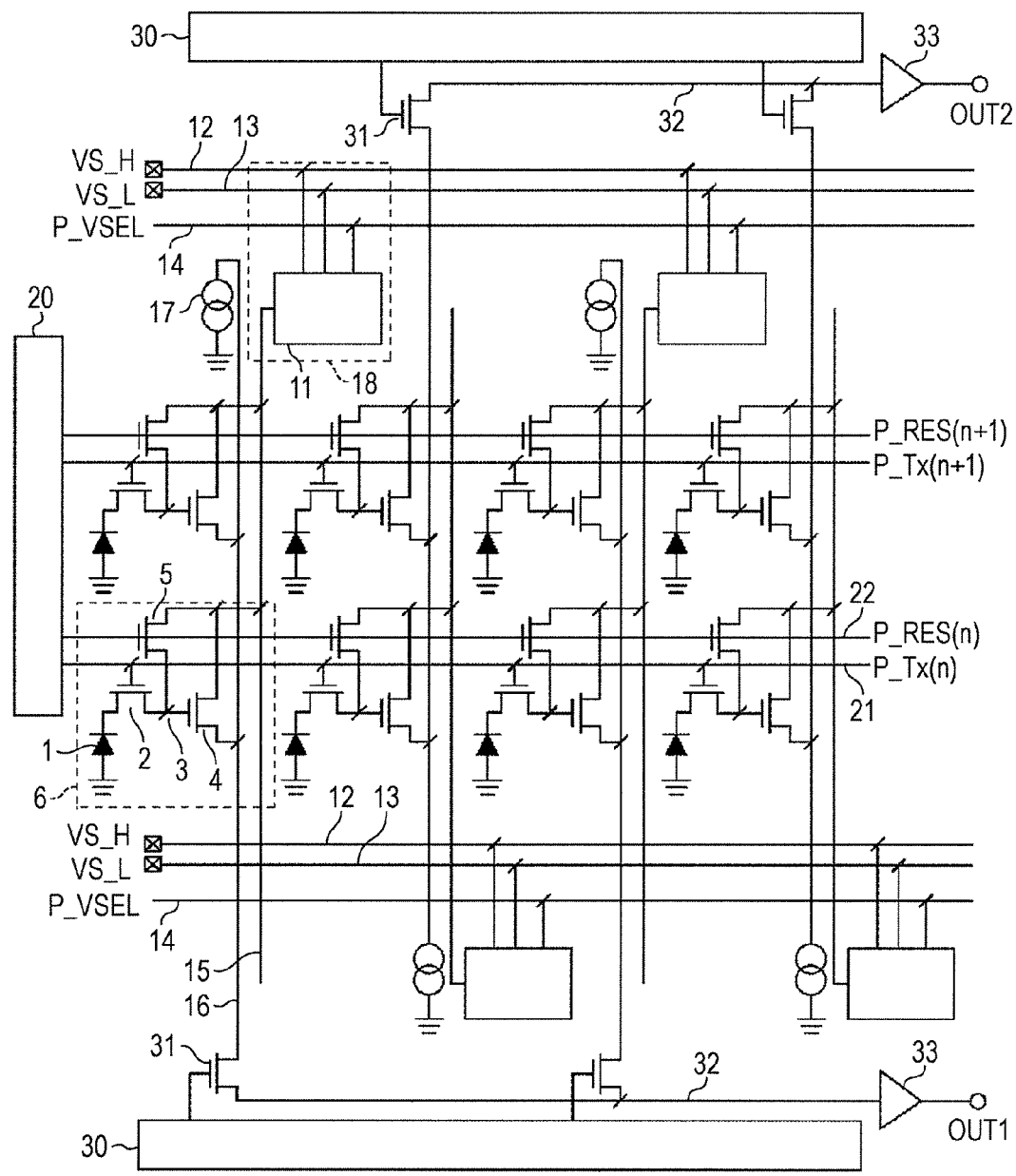
FIG. 13 is a schematic diagram for explaining a photoelectric conversion apparatus according to a sixth embodiment.

FIG. 13 is a schematic diagram showing a sixth embodiment of the present invention. The sixth embodiment is different from the fifth embodiment in the positions of the voltage supply control circuits 11. A feature of the sixth embodiment is that the voltage supply control circuits 11 are alternately disposed on one side and the other side of the photoelectric conversion area such that a voltage supply control circuit 11 disposed in a column diagonally faces a voltage supply control circuit 11 disposed in an adjacent column across the photoelectric conversion area. Although not illustrated, the voltage supply control circuits 11 may be disposed such that a circuit group including a plurality of voltage supply control circuits 11 diagonally faces an adjacent circuit group including a plurality of voltage supply control circuits 11 across the photoelectric conversion area. The operation of the photoelectric conversion apparatus according to the sixth embodiment is similar to that of the first embodiment. Thus, the explanation of the operation of the photoelectric conversion apparatus according to the sixth embodiment will be omitted.

With the configuration used in the sixth embodiment, the frame rate can be improved due to the voltage supply control circuits 11 provided for the individual columns. In addition, the direction of shading alternately changes between the upper end and the lower end of the photoelectric conversion area. Thus, since, in terms of the entire outputs, an average of shadings of the individual columns can be visually recognized, the image quality can be significantly improved. Furthermore, since circuits can be easily disposed, this configuration is effective even when the pixel size is reduced.

Seventh Embodiment

Figure 14:
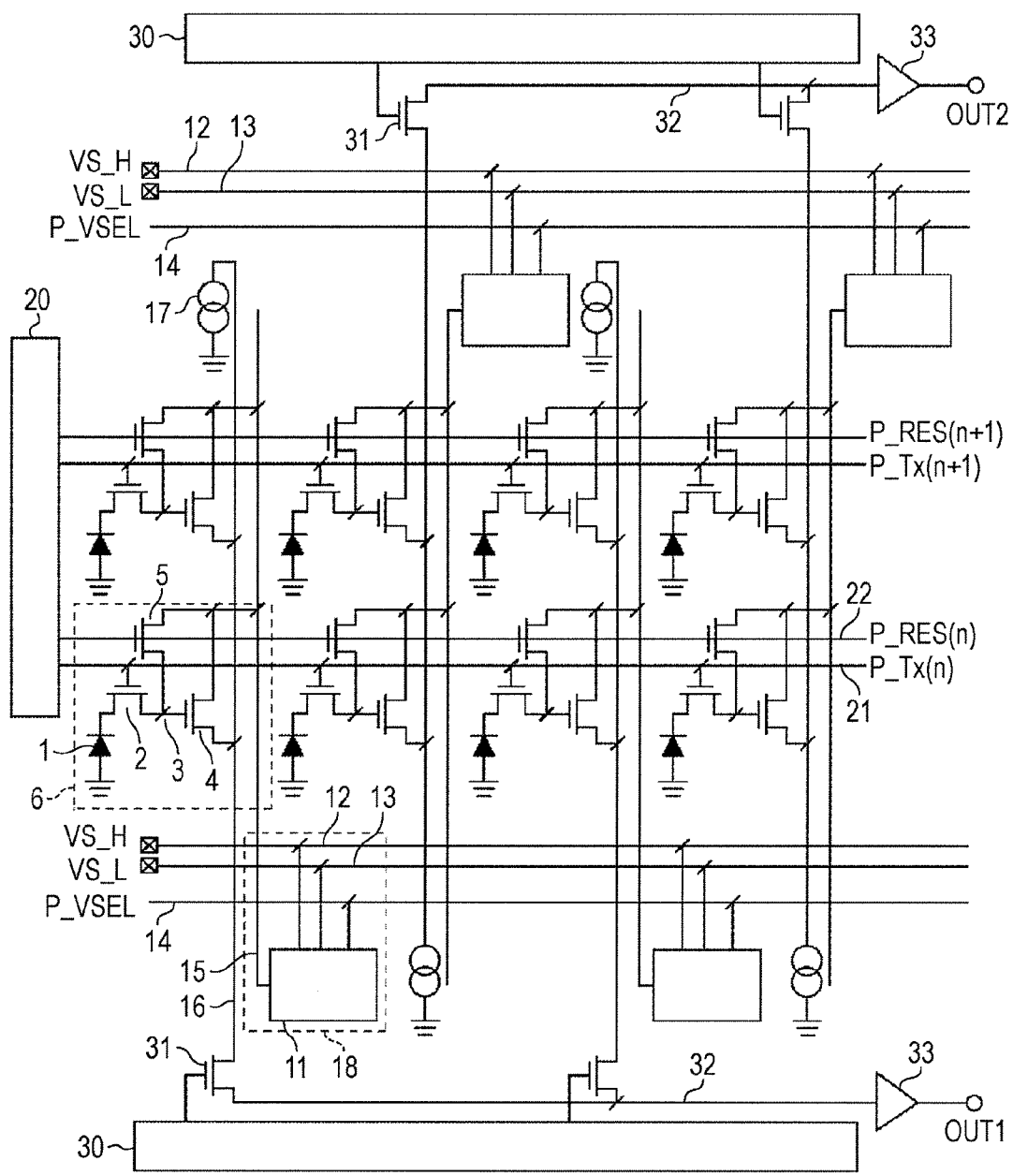
FIG. 14 is a schematic diagram for explaining a photoelectric conversion apparatus according to a seventh embodiment.

FIG. 14 is a schematic diagram showing a seventh embodiment of the present invention. The seventh embodiment is different from the fifth embodiment in the positional relationship between the voltage supply control circuits 11 and the constant-current sources 17. The voltage supply control circuits 11 are disposed so as to diagonally face the constant-current sources 17, which serve as load units connected to the output lines 16, across the photoelectric conversion area. In addition, the positions of the voltage supply control circuit 11 and the constant-current source 17 are opposite to each other between two adjacent columns. Although not illustrated, the positions of the voltage supply control circuit 11 and the constant-current source 17 may be opposite to each other between two adjacent column groups each including a plurality of columns. The operation of the photoelectric conversion apparatus according to the seventh embodiment is similar to that of the first embodiment. Thus, the explanation of the operation of the photoelectric conversion apparatus according to the seventh embodiment will be omitted.

With the configuration used in the seventh embodiment, the frame rate can be improved due to the voltage supply control circuits 11 provided for the individual columns. In addition, since the voltage supply control circuits 11 can be disposed near the photoelectric conversion area, the parasitic resistance generated in wiring can be reduced. Thus, a voltage drop can be suppressed. In addition, since a voltage supply control circuit is disposed on a side on which a constant-current source is not disposed and a constant-current source is disposed on a side on which a voltage supply control circuit is not disposed, only a voltage supply control circuit and a constant-current source are provided for each two columns. Thus, since an unnecessary space in a circuit configuration is reduced, such a configuration is suitable for miniaturization. Furthermore, since a symmetrical structure with respect to pixels is provided for each column, the layout symmetry from an optical point of view can be achieved.

Eighth Embodiment

Figure 15:
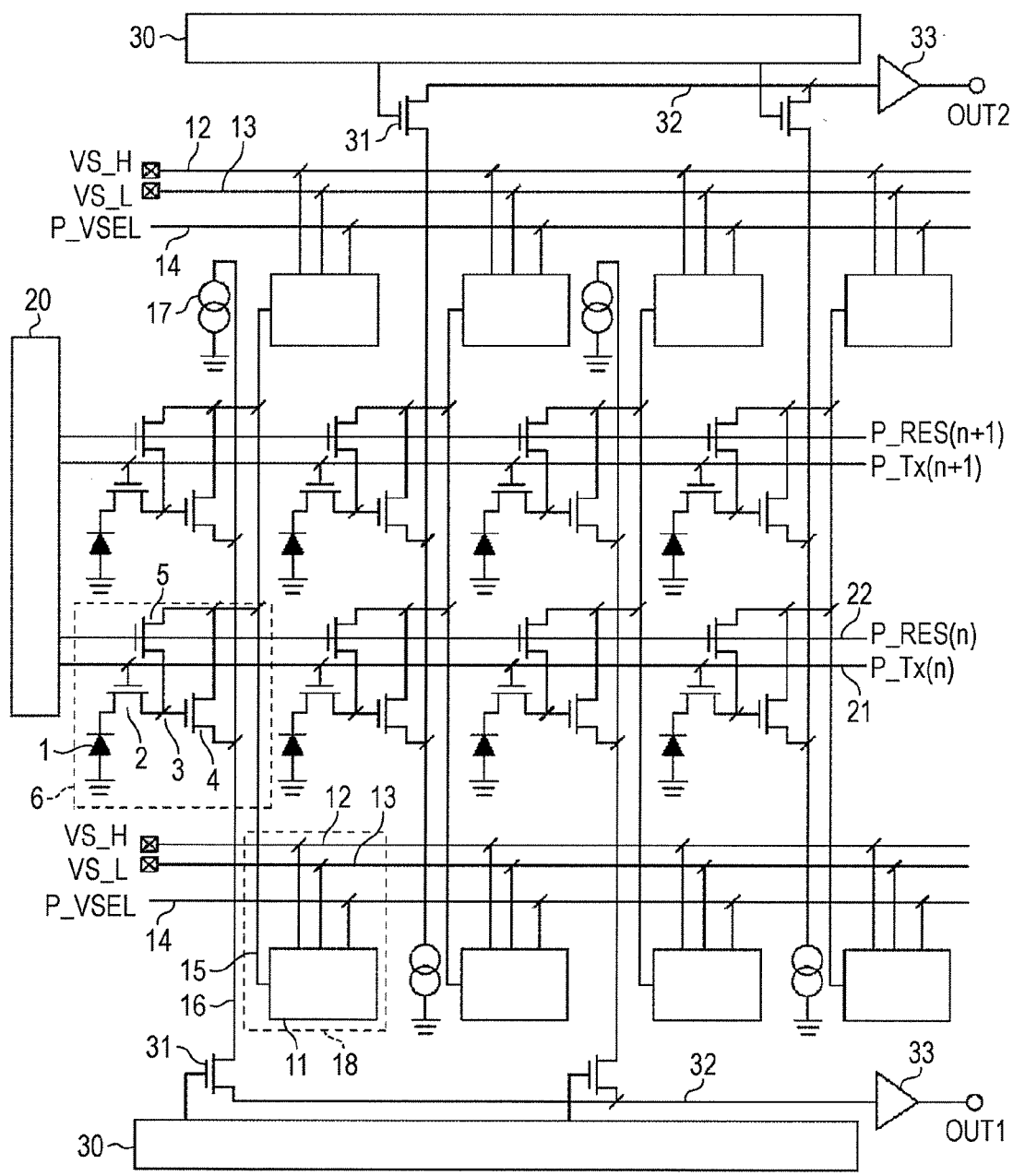
FIG. 15 is a schematic diagram for explaining a photoelectric conversion apparatus according to an eighth embodiment.

FIG. 15 is a schematic diagram showing an eighth embodiment of the present invention. The eighth embodiment is different from the fifth embodiment in the configuration of the voltage supply control circuits 11. A feature of the eighth embodiment is that the voltage supply control circuits 11 are disposed such that voltage supply control circuits are provided for an individual column on the upper end and the lower end of pixels. The operation of the photoelectric conversion apparatus according to the eighth embodiment is similar to that of the first embodiment. Thus, the explanation of the operation of the photoelectric conversion apparatus according to the eighth embodiment will be omitted.

With the configuration used in the eighth embodiment, the frame rate can be improved due to the voltage supply control circuits 11 provided for the individual columns. In addition, the potentials of the voltage supply lines 15 can be set from positions that face each other across the photoelectric conversion area, that is, from both sides in the column direction. Thus, the time constant can be reduced, and the frame rate can be further improved. Furthermore, the shading phenomenon caused by a difference in voltage drop in the column direction of each of the voltage supply lines 15 can be suppressed.

Ninth Embodiment

Figure 16:
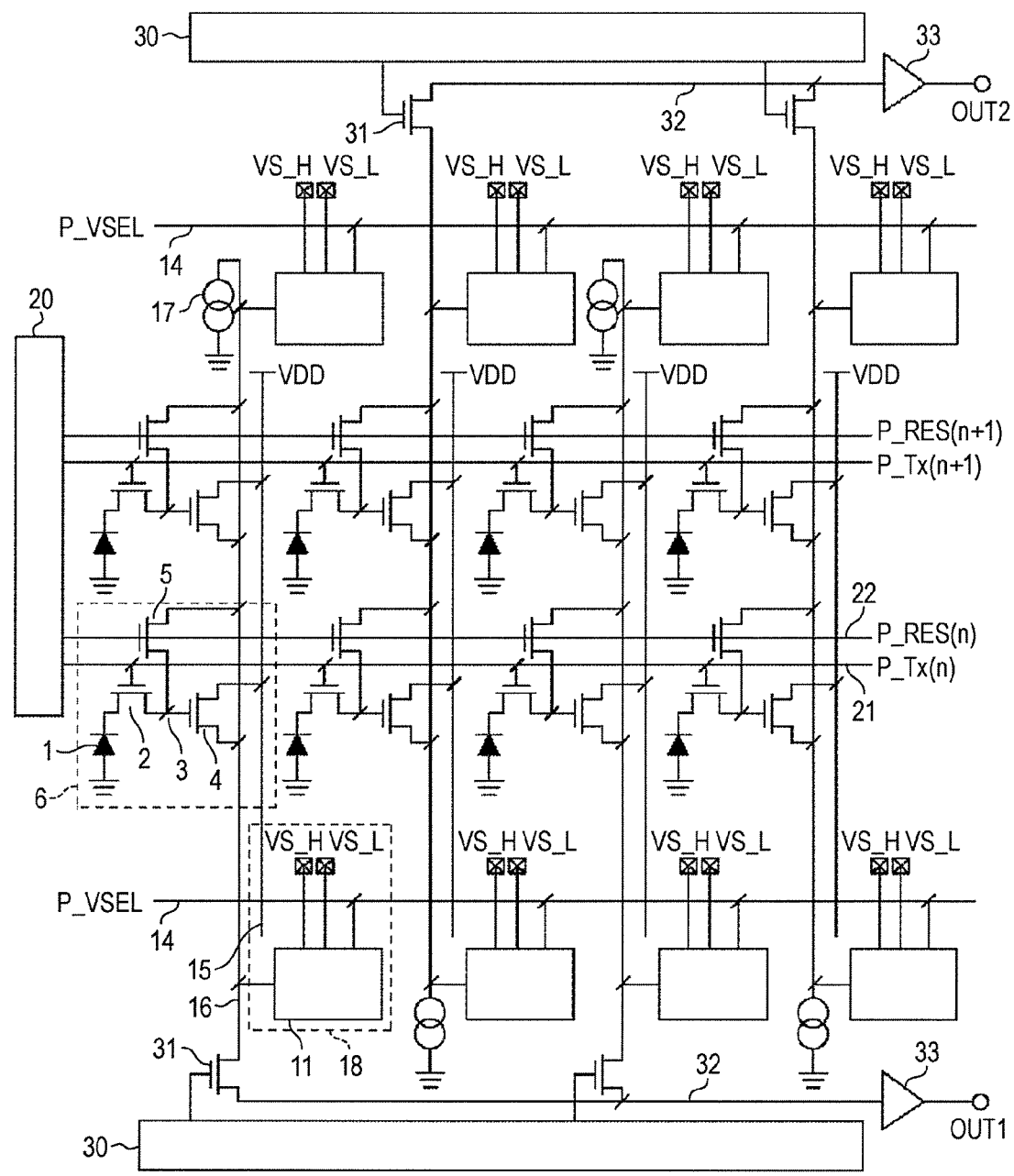
FIG. 16 is a schematic diagram for explaining a photoelectric conversion apparatus according to a ninth embodiment.

FIG. 16 is a schematic diagram showing a ninth embodiment of the present invention. The ninth embodiment is different from the eighth embodiment in the configuration of voltage supply lines. In the ninth embodiment, a voltage supply line for supplying a voltage to the drain of the voltage supply unit (reset MOS transistor) 5 also serves as an output line. A line for supplying a voltage to the drain of the amplifying unit (amplifying MOS transistor) 4 also supplies a fixed voltage of VDD. Furthermore, power supply voltages applied to the voltage supply control circuits 11 can be set.

An operation of the photoelectric conversion apparatus shown in FIG. 16 will be described with reference to a schematic timing diagram shown in FIG. 17. Here, an operation in the nth row will be briefly described, where a row from which optical signals of pixels are output, that is, a selected row, is denoted by the nth row, and another row, that is, a non-selected row, is denoted by the n+1th row.

Figure 17:
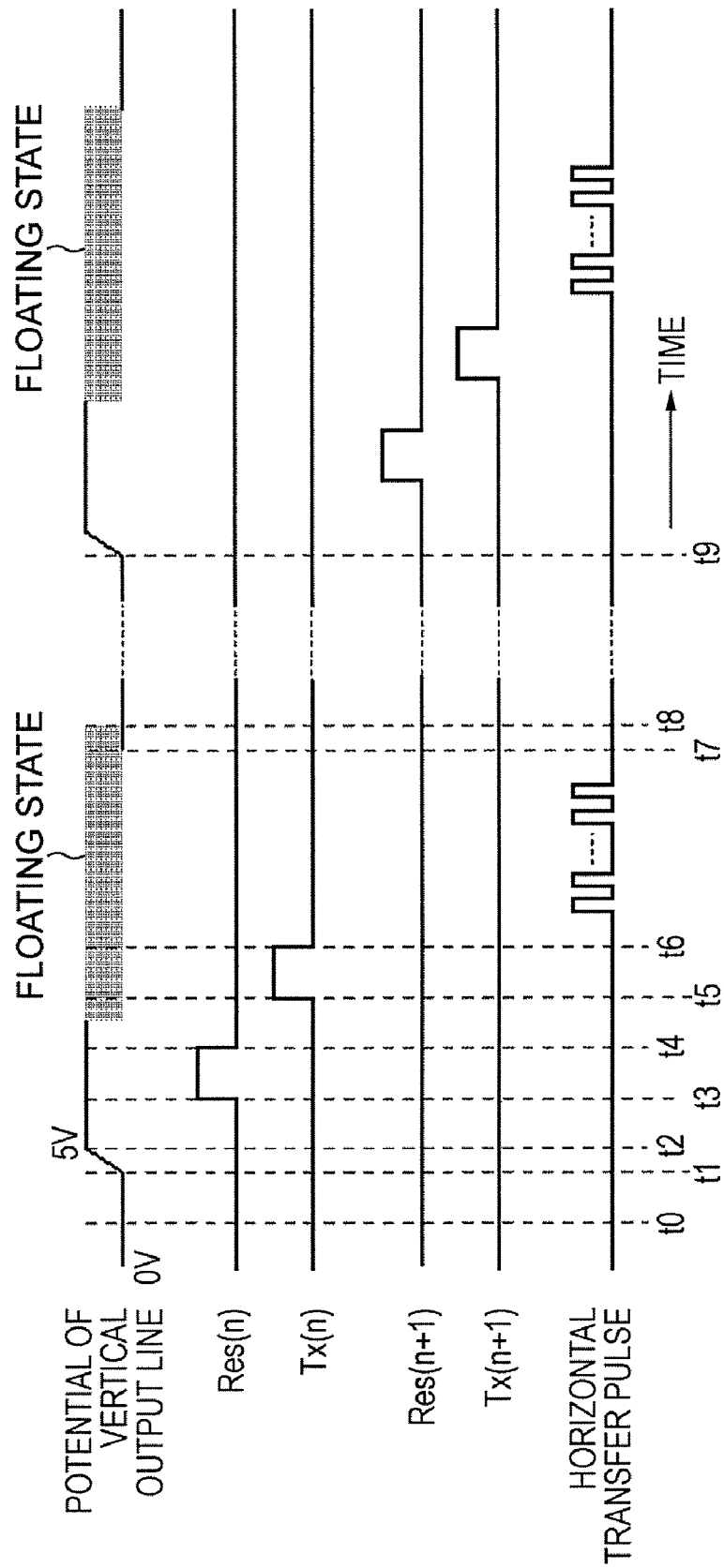
FIG. 17 is a schematic diagram showing timing for explaining an operation of the photoelectric conversion apparatus according to the ninth embodiment.

Referring to FIG. 17, at time t0, the potentials of the output lines 16 set by the voltage supply control circuits 11 are low (0 V). The levels of reset switch control pulses P_Res(n) and P_Res(n+1) and transfer switch control pulses P_Tx(n) and P_Tx(n+1) are low. At this time, the voltage supply units (reset MOS transistors) 5 are in a non-conductive state, and the input units (FD regions) 3 have a low potential (about 0 V) and are in a floating state. In addition, the amplifying units (amplifying MOS transistors) 4 are in a non-selected state. Thus, the potentials of the output lines 16 are not changed.

During the period from time t1 to time t2, the output lines 16 serving as voltage supply lines reach a high potential (5 V) by the voltage supply control circuits 11 provided for the individual columns. Here, since the voltage supply control circuits 11 are provided for the individual columns in which the output lines 16 are disposed, the time necessary for setting the potentials of the output lines 16 can be reduced. Thus, the time necessary for setting all the output lines 16 in the photoelectric conversion area from the low potential (0 V) to the high potential (5 V) can be reduced.

During the period from time t3 to time t4, the level of the reset switch control pulse P_Res(n) in the nth row is set to high. Here, the voltage supply units (reset MOS transistors) 5 are in a conductive state, and the potentials of the input units (FD regions) 3 are set to high.

Then, the level of the reset switch control pulse P_Res(n) is set to low, the voltage supply control circuits 11 are in the OFF state, and the constant-current sources 17 are in the ON state. Thus, the amplifying units (amplifying MOS transistors) 4 reach a selected state. Accordingly, a state in which the potentials of the output lines 16 are changed in accordance with potential changes of the FD regions included in the pixels in the nth row, that is, a state in which the pixels in the nth row are selected, is reached.

Then, during the period from time t5 to time t6, the level of the transfer switch control pulse P_Tx(n) in the nth row is set to high. Here, the transfer units (transfer MOS transistors) 2 are in the conductive state, and electric charges are transferred from the photoelectric conversion elements 1 to the input units (FD regions) 3. The potentials of the input units (FD regions) 3 are changed in accordance with the amounts of transferred electric charges, and the potentials of the output lines 16 are changed through the amplifying units (amplifying MOS transistors) 4.

Then, during the period from time t6 to time t7, during which the level of the transfer switch control pulse P_Tx(n) in the nth row is set to low, horizontal transfer pulses sequentially reach the conductive state, and the horizontal transfer switches 31 sequentially reach the conductive state. Then, the signal levels of the output lines 16 are sequentially output through the horizontal signal transfer lines 32 and the output amplifiers 33.

Then, during the period from time t7 to time t8, the potentials of the output lines 16 reach a low potential (0 V) by the voltage supply control circuits 11 provided for the individual columns. Here, since the voltage supply control circuits 11 are provided for the individual columns in which the output lines 16 are disposed, the time necessary for setting the potentials of the output lines 16 can be reduced. Thus, the time necessary for setting all the output lines 16 in the photoelectric conversion area can be reduced. Then, an operation for selecting pixels in the n+1th row is performed.

With the configuration used in the ninth embodiment, since the voltage supply control circuits 11 are provided for the individual columns, the time necessary for setting the potentials of the output lines 16 can be reduced even when the size of the photoelectric conversion area is increased. Thus, the frame rate can be improved. Furthermore, since the voltage supply control circuits 11 are disposed such that voltage supply control circuits are provided on both sides in the column direction of pixels, the potentials of the output lines 16 can be set from both sides. Thus, the time constant can be reduced, and the frame rate can be further improved. In addition, the shading phenomenon caused by a difference in voltage drop in the column direction of the output lines 16 can be suppressed. Furthermore, power supply voltages applied to the voltage supply control circuits 11 can be set. Thus, when offsets or the like are superimposed in individual columns due to variations in thresholds of MOS transistors, voltage setting so as to cancel the superimposed offset can be achieved. That is, fixed pattern noise generated in individual columns can be eliminated.

As described above, a photoelectric conversion apparatus according to each of the foregoing embodiments achieves an improvement in the frame rate. In addition, with the configuration used in each of the foregoing embodiments, at least one of suppression of a shading phenomenon, an increase in the number of pixels, a reduction in the pixel size, and the like, can be achieved.

Although an example of the configuration of the power-supply controller 18 is shown in FIG. 2, the power-supply controller 18 is not necessarily limited to the configuration shown in FIG. 2. The power-supply controller 18 has a configuration different from the configuration shown in FIG. 2 as long as the power-supply controller 18 has a unit to switch the voltage level of a controlled line.

Figure 18:
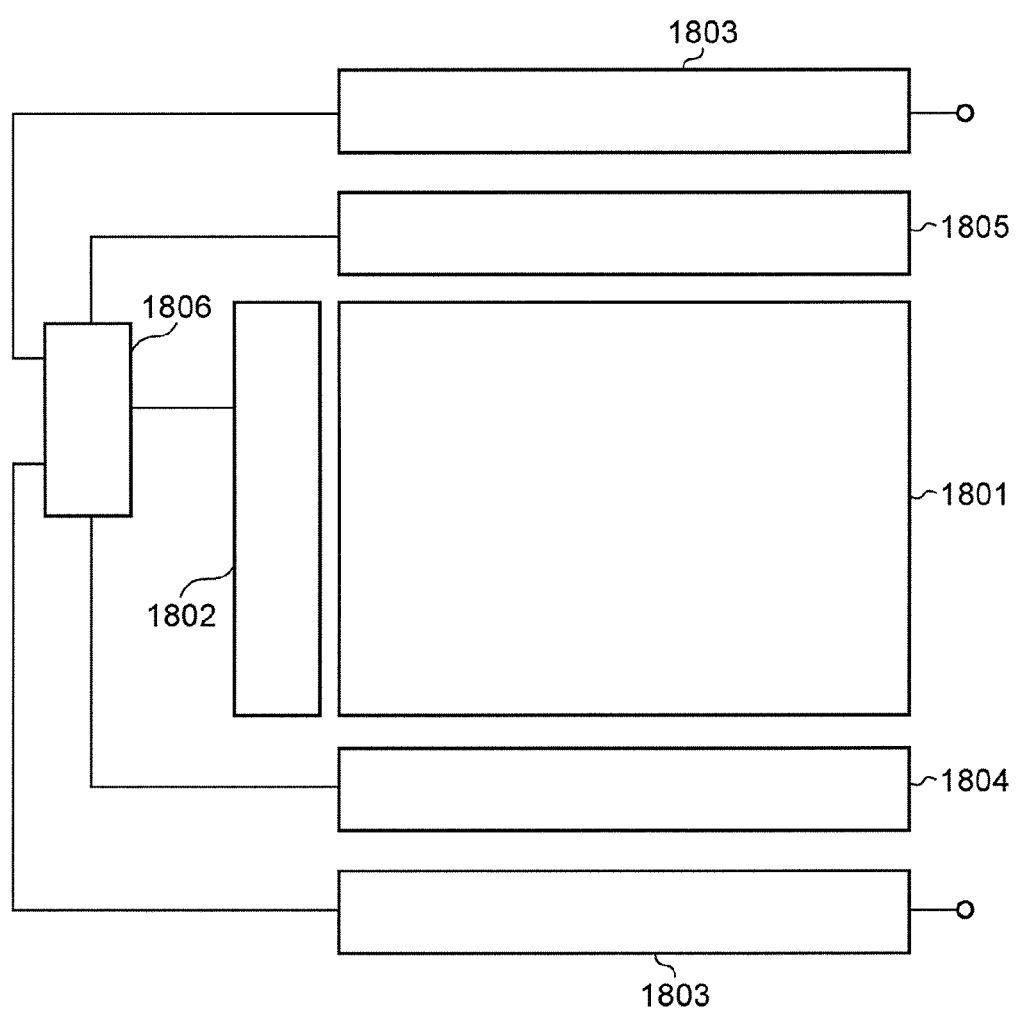
FIG. 18 is a schematic diagram for explaining a photoelectric conversion apparatus according to an embodiment of the present invention.

Voltage supply control circuits and constant-current sources are disposed outside a photoelectric conversion area. FIG. 18 is a schematic diagram showing the above-mentioned configuration. Referring to FIG. 18, reference numeral 1801 denotes a photoelectric conversion area, and reference numerals 1804 and 1805 each denote an area in which at least one of a voltage supply control circuit and a constant-current source is provided. The areas 1804 and 1805 are disposed so as to face each other across the photoelectric conversion area 1801. A control unit 1806 performs power supply and pulse signal supply to the areas 1804 and 1805. The control unit 1806 is also capable of controlling scanning circuits 1802 and 1803. Signals are output from the scanning circuits 1803. In FIG. 18, part of wiring for allowing connection between areas and circuits is omitted.

Although a configuration in which switching between two types of voltage levels, 0V and 5V, is performed has been described above, the voltage levels are not limited to the two types described above. A configuration in which switching between other voltages or switching between three or more types of voltage levels is performed can be adopted.

Image Pickup System using Photoelectric Conversion Apparatus

Figure 19:
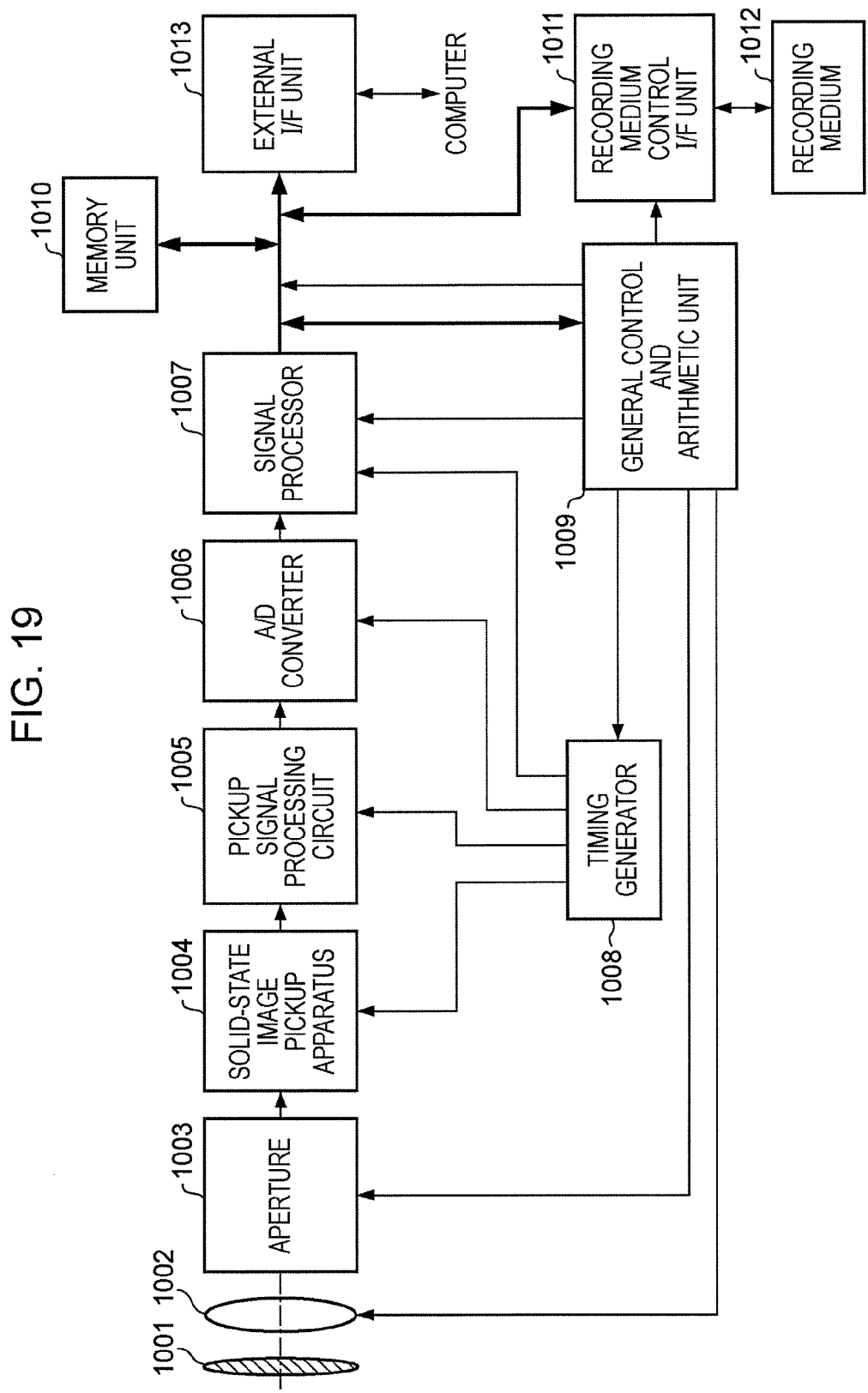
FIG. 19 is a block diagram of an image pickup system using a photoelectric conversion apparatus according to an embodiment of the present invention.

FIG. 19 is an example of circuit blocks when a solid-state image pickup apparatus according to an embodiment of the present invention is used for a camera. A shutter 1001 for controlling exposure is provided before an objective taking lens 1002. An aperture 1003 controls the light intensity according to need and forms an image on a solid-state image pickup apparatus 1004. A signal output from the solid-state image pickup apparatus 1004 is processed by an image pickup signal processing circuit 1005, and the processed signal is converted from an analog signal to a digital signal by an A/D converter 1006. The digital signal output from the A/D converter 1006 is subjected to arithmetic processing by a signal processor 1007. The processed digital signal is stored in a memory unit 1010 or transmitted to an external apparatus via an external I/F unit 1013. The solid-state image pickup apparatus 1004, the image pickup signal processing circuit 1005, the A/D converter 1006, and the signal processor 1007 are controlled by a timing generator 1008. In addition, the entire system is controlled by a general control and arithmetic unit 1009. In order to record an image in a recording medium 1012, an output digital signal is recorded through a recording medium control I/F unit 1011 controlled by the entire control and arithmetic unit 1009.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-209755 filed Aug. 1, 2006, which is hereby incorporated by reference herein in its entirety.

What is claimed is:

1. A photoelectric conversion apparatus comprising:
   a photoelectric conversion area that includes:
     a plurality of photoelectric conversion elements, each photoelectric conversion element configured to convert incident light into electric carriers,
     a plurality of amplifying units, each amplifying unit configured to read out signals based on electric carriers of a corresponding photoelectric conversion element to a corresponding output line of a plurality of output lines,
     a plurality of transfer units, each transfer unit configured to transfer electric carriers of a corresponding photoelectric conversion element to an input unit of a corresponding amplifying unit, and
     a plurality of voltage supply units, each voltage supply unit configured to supply to a corresponding input unit voltages for setting the corresponding input unit to have at least first and second potentials,
     wherein the plurality of photoelectric conversion elements, the plurality of amplifying units, the plurality of transfer units, and the plurality of voltage supply units are arranged in a matrix;
   a plurality of power supply lines configured to supply voltages to the plurality of voltage supply units;
   a plurality of voltage supply control circuits, each disposed in a power supply channel between a corresponding one of the plurality of power supply lines and a corresponding one of the plurality of voltage supply units, and each configured to control a voltage supply to a corresponding voltage supply unit, wherein the plurality of voltage supply control circuits are disposed on at least one side of the photoelectric conversion area;

a plurality of voltage supply lines configured to supply voltages from the plurality of voltage supply control circuits to the plurality of voltage supply units, wherein the plurality of voltage supply lines are provided for individual columns in which the plurality of photoelectric conversion elements are arranged and supply voltages to voltage supply units in each column; and a plurality of control lines configured to control the plurality of voltage supply units, wherein the plurality of control lines are provided for individual rows in which the plurality of photoelectric conversion elements are arranged and control voltage supply units in each row.

2. The photoelectric conversion apparatus according to claim 1, wherein the plurality of voltage supply control circuits are provided for individual columns in which the plurality of voltage supply units are arranged.

3. The photoelectric conversion apparatus according to claim 2, wherein the plurality of voltage supply control circuits are alternately disposed on a first side and a second side of the columns in which the plurality of voltage supply units are arranged.

4. The photoelectric conversion apparatus according to claim 2, wherein the plurality of voltage supply control circuits are arranged such that a voltage supply control circuit is provided, across the photoelectric conversion area, on both sides of a column in which a corresponding voltage supply unit is arranged.

5. The photoelectric conversion apparatus according to claim 1, wherein signals read in parallel from the plurality of output lines are sequentially read and supplied to a plurality of channels.

6. The photoelectric conversion apparatus according to claim 1, wherein the photoelectric conversion apparatus is incorporated in an image pickup system that includes:
 an optical system arranged to form light into an image on the photoelectric conversion apparatus; and
 a signal processing circuit arranged to process a signal output from the photoelectric conversion apparatus.

7. A photoelectric conversion apparatus comprising:
a photoelectric conversion area that includes:
 a plurality of photoelectric conversion elements, each photoelectric conversion element configured to convert incident light into electric carriers,
 a plurality of amplifying units, each amplifying unit configured to read out signals based on electric carriers of a corresponding photoelectric conversion element to a corresponding output line of a plurality of output lines,
 a plurality of transfer units, each transfer unit configured to transfer electric carriers of a corresponding photoelectric conversion element to an input unit of a corresponding amplifying unit, and
 a plurality of voltage supply units, each voltage supply unit configured to supply to a corresponding input unit voltages for setting the corresponding input unit to have at least first and second potentials,
 wherein the plurality of photoelectric conversion elements, the plurality of amplifying units, the plurality of transfer units, and the plurality of voltage supply units are arranged in a matrix;

a plurality of power supply lines configured to supply voltages to the plurality of voltage supply units;

a plurality of voltage supply control circuits, each disposed in a power supply channel between a corresponding one of the plurality of power supply lines and a corresponding one of the plurality of voltage supply units, and each configured to control a voltage supply to a corresponding voltage supply unit;

a plurality of voltage supply lines configured to supply voltages from the plurality of voltage supply control circuits to the plurality of voltage supply units, wherein the plurality of voltage supply lines and the plurality of output lines are provided for individual columns in which the plurality of photoelectric conversion elements are arranged and supply voltages to voltage supply units in each column; and a plurality of control lines configured to control the plurality of voltage supply units, wherein the plurality of control lines are provided for individual rows in which the plurality of photoelectric conversion elements are arranged and control voltage supply units in each row, wherein a plurality of constant-current sources are connected to corresponding ones of the plurality of output lines, and wherein the plurality of voltage supply control circuits are arranged so as to face the plurality of constant-current sources across the photoelectric conversion area.

* * * * *